S. HUGHES.

Lamp-Heaters for Nursery-Flasks.

No. 130,429.　　　　　　　　Patented Aug. 13, 1872.

UNITED STATES PATENT OFFICE.

SEYMOUR HUGHES, OF JERSEY CITY, NEW JERSEY.

IMPROVEMENT IN LAMP-HEATERS FOR NURSERY-FLASKS.

Specification forming part of Letters Patent No. 130,429, dated August 13, 1872.

Specification describing a new and Improved Nursery-Flask Heater, invented by SEYMOUR HUGHES, of Jersey City, in the county of Hudson and State of New Jersey.

Figure 1:
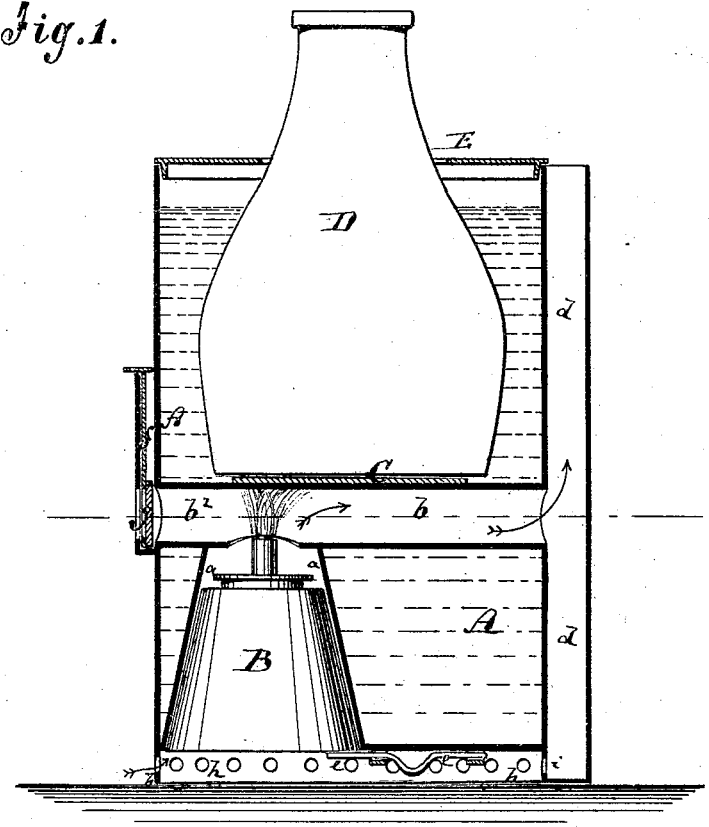
Figure 2:
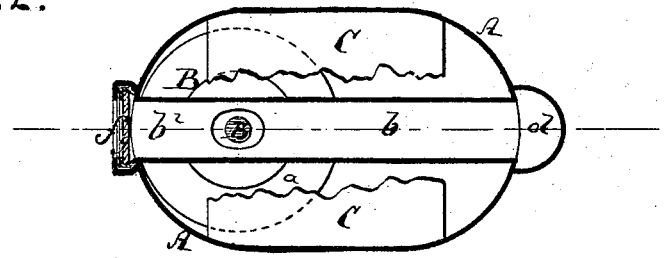

Figure 1 represents a vertical section, and Fig. 2 a horizontal section, of my improved nursery-flask heater.

Similar letters of reference indicate corresponding parts.

This invention relates to a new apparatus for heating the contents of nursery-flasks and similar vessels; and consists in the use of a portable water-heater containing a lamp, flues, and a platform for the support of the flask. The latter can be placed within the heated water to have its contents gradually and gently warmed without exposing the flask to injury or wasting heat. The invention also consists in providing the flue of the water-heater with a transparent section so that it may also serve as a lamp.

A in the drawing represents a sheet-metal vessel, preferably oval in horizontal section, and of suitable dimensions. In its lower part is formed a cavity, $a$, for the insertion of a lamp, B, from below. Said lamp can be held in place by a bolt or catch, $e$. From the upper part of the cavity $a$ extend two horizontal flues, $b$ and $b^2$, in opposite directions, the one $b$ leading into a vertical flue, $d$, as shown. The end of the other flue $b^2$ is formed by a slide, $f$, which contains a glass or isinglass window, $g$, and through which the light of the lamp can be seen, so that the device can also be used for illuminating purposes. The slide $f$ can also be more or less raised to regulate the admission of air to the flame of the lamp, though the ordinary supply is admitted through apertures in the bottom flange $h$ of the vessel A. Above the flues $b$ $b^2$ is, within the vessel A, formed a horizontal platform, C, for the support of the flask D to be warmed. E is a cover for the vessel A, perforated in the middle to admit the neck of the bottle or flask. This cover can, however, be dispensed with.

When the apparatus is to be used the vessel A is partly filled with water and the lamp lighted so as to heat the water. The flask can at any time be placed into the vessel A upon the platform C, as shown, and will have its contents gradually heated by the surrounding water. The horizontal flue $b$ carries the heated gases rapidly away from under the flask to prevent injury to the latter by excessive heat.

The invention will be of great use in all nurseries, and also while traveling, as it permits the convenient heating of children's meals.

That feature of the invention which shows the lamp B surrounded by the water in the lower part of the vessel A I consider important and valuable for various purposes, as by means of the water surrounding it the lamp is prevented from overheating and exploding.

The lower end of the flue $d$ is or may be perforated, as at $i$, to discharge any moisture that may be condensed within it from the ascending gases.

Having thus described my invention, I claim as new and desire to secure by Letters Patent—

1. The nursery flask-heater, consisting of the vessel A, which is provided with the cavity $a$, flues $b$ $d$, and platform C, substantially as herein shown and described.

2. The combination of the water-vessel A with the heating-lamp B, in such manner that the lamp will be surrounded by the water in the lower part of the vessel A, as set forth.

3. The slide $f$, applied to the end of the horizontal flue $b^2$, for controlling the admission of air, as set forth.

4. The window $g$, arranged on one flue of the flask-heater to permit the use of the same as a lamp, as set forth.

SEYMOUR HUGHES.

Witnesses:
A. V. BRIESEN,
T. B. MOSHER.